United States Patent [19]

Westphal et al.

[11] Patent Number: 4,848,003

[45] Date of Patent: Jul. 18, 1989

[54] POSITIONING DEVICE

[75] Inventors: James A. Westphal, Altadena; Michael A. Carr, La Crescenta, both of Calif.

[73] Assignee: California Institute of Technology, Pasadena, Calif.

[21] Appl. No.: 594,760

[22] Filed: Mar. 28, 1984

Related U.S. Application Data

[63] Continuation-in-part of Ser. No. 365,261, Apr. 5, 1982, Pat. No. 4,468,864.

[51] Int. Cl.$^4$ .................................................. G01C 9/06
[52] U.S. Cl. .................................. 33/384; 33/379; 33/1 H
[58] Field of Search ............... 33/1 H, 366, 375, 374, 33/376, 379, 384, 385, 386, 387

[56] References Cited

U.S. PATENT DOCUMENTS

| | | | |
|---|---|---|---|
| 2,130,648 | 9/1938 | Smith | 73/382 |
| 2,178,264 | 10/1939 | Meyer | 33/174 TD |
| 2,640,267 | 6/1953 | Geier | 33/299 |
| 3,030,710 | 4/1962 | Fell | 33/385 X |
| 4,521,974 | 6/1985 | Neis et al. | 33/379 |

FOREIGN PATENT DOCUMENTS

| | | | |
|---|---|---|---|
| 1053926 | 10/1953 | France | 33/386 |
| 517477 | 2/1955 | Italy | 33/385 |
| 0086307 | 7/1981 | Japan | 33/366 |

Primary Examiner—Harry N. Haroian

[57] ABSTRACT

Apparatus is described for positioning a tilt meter (12) in a horizontal plane (14) and maintaining it horizontal despite temperature changes, with greater precision than heretofore. Leveling screws 25–27 which hold the upper surface (18) of a base member (16) precisely horizontal, are engaged with nuts (21–23) attached to the base member, where the nuts are made of the same material as the screws, to eliminate tilting of the base member with temperature changes, due to different nuts engaging a screw at a different height. The nuts are attached to the upper surface (18) of the base member, to further avoid imprecision. The curved glass bubble tubes (60) are mounted in V-grooves (80) in four point contact therewith.

4 Claims, 1 Drawing Sheet

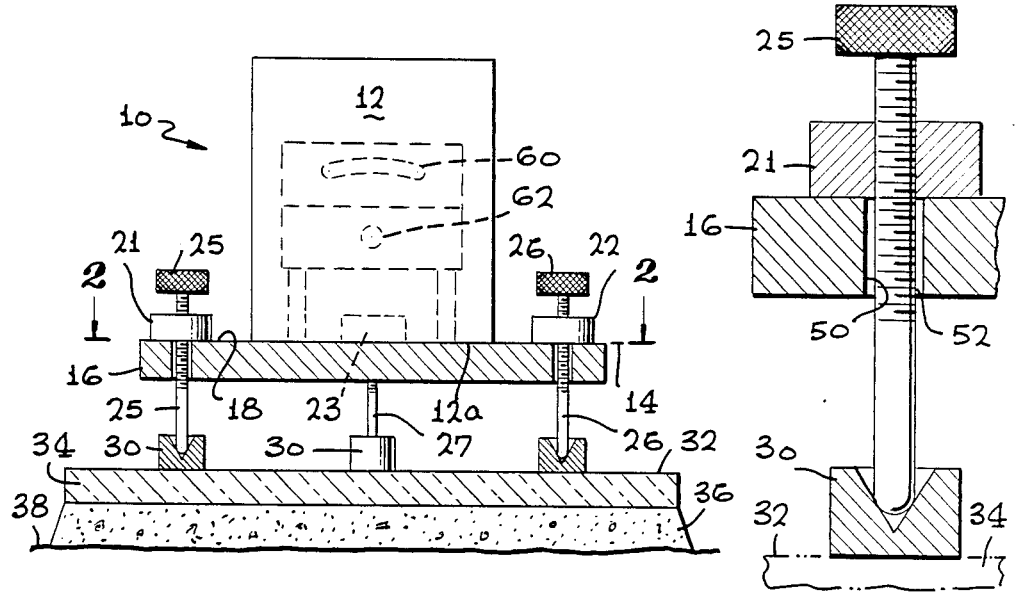

4,848,003

POSITIONING DEVICE

CROSS REFERENCE TO RELATED APPLICATION

This is a continuation-in-part of U.S. patent application Ser. No. 365,261 filed Apr. 5, 1982, now U.S. Pat. No. 4,468,864.

BACKGROUND OF THE INVENTION

Investigations of various geological phenomena including volcanos and earthquakes, involves precise measurement of tilting of the earths surface. A tilt meter such as a curved glass tube containing liquid and a gas bubble, can be supported in a close-to-horizontal position by mounting it on equipment that rests on a rock or other surface of the earth. While tilt sensors of only moderate costs are available for measuring tilt with extreme precision such as $10^{-7}$ radians such precision can be masked by tilting caused by thermal expansion and contraction of the mounting equipment. Such thermal expansion and contraction can be minimized by constructing the mounting equipment of material having an extremely low thermal coefficient of expansion (tce). However, such materials typically are very hard to machine to the required shapes, and their extensive use in the mounting equipment can greatly increase its costs. In many investigations, large numbers of tilt measuring installations are used, and it is desireable that the mounting equipment be of moderate cost.

SUMMARY OF THE INVENTION

In accordance with one embodiment of the present invention, a positioning apparatus of only moderate costs is provided for maintaining a device in a precisely horizontal plane. The apparatus includes a base member which is to be positioned in a horizontal plane to hold a device thereon, a group of nuts coupled to the base member, and a group of screws that each threadably engage one of the nuts and which have a lower end supported on a grounding surface that lies over the ground. The nuts and screws have the same thermal coefficient of expansion, so that tilting of the positioning apparatus does not arise from the fact that different screws threadably engage the nuts at different locations along the nuts.

The nuts are preferrably located against the upper surface of the base member upon which the device to be horizontally positioned is located. This avoids tilting arising from irregularities in the thickness and thermal coefficient of expansion of the base member.

A tilt sensor which can lie on the positioning device, has at least one curved tube which carries a liquid and a gas bubble. A housing which holds the sensor, forms a V-shaped groove. The tube is biased against the walls of the V-groove to make four point contact therewith, with each end of the tube contacting opposite sides of the groove.

The novel features of the invention are set forth with particularity in the appended claims. The invention will be best understood from the following description when read in conjunction with the accompanying drawings.

BRIEF DESCRIPTION OF THE DRAWINGS

FIG. 1 is a sectional side view of a positioning apparatus constructed in accordance with the present invention.

FIG. 2 is a view taken on the line 2—2 of FIG. 1.

FIG. 3 is a partial sectional view of the apparatus of FIG. 1, shown in greater detail.

FIGS. 4A and 4B are representational views of a portion of FIG. 3, for aiding in explaining operation of the apparatus.

FIG. 5 is a partial sectional view of the tilt sensing device of FIG. 1.

DESCRIPTION OF THE PREFERRED EMBODIMENT

FIG. 1 illustrates a positioning apparatus 10 which supports a tilt sensing device 12 so its lower end 12a lies precisely in a horizontal plane 14. The positioning apparatus includes a base member 16 which has a support surface 18 which supports the tilt sensing device 12 and which lies precisely in the horizontal plane 14. Three nuts 21–23 are mounted on the base member and are supported by three screws 25–27. The bottoms of the screws lie in coupling cups 30 that lie on a grounding surface 32 formed by the upper surface of a tile 34. The tile is held by cement 36 onto the ground 38 and the cups are adhesively bonded to the tile.

The ground 38 may be an area of a rock which has been chipped to lie generally horizontal. The tile 34 is cemented in place so that its upper or grounding surface 32 is fairly close to horizontal. The positioning apparatus is then mounted over the grounding surface and the tilt sensing device 12 is placed on the positioning apparatus. The adjustment screws 25–27 are then adjusted to hold the tilt sensing device 12 in a precisely horizontal plane.

Available tilt sensing devices 12 can measure extremely small tilts on the order of $10^{-7}$ radians. In order to make use of such sensitivity, the tilt sensing device 12 should be maintained at a precisely constant angular position with respect to the ground 38 to which it is mounted. Temperature changes in the environment, which may be especially severe where tilting in the vicinity of a volcano is to be measured, can lead to expansions and contractions in elements of the positioning apparatus 10. Such expansions and contractions have the potential of causing undesireable tilting of the support surface 18 with respect to the ground 38 as the temperature changes.

One potential source of undesirable tilting, arises from expansion and contraction in the height of the screws and nuts such as screw 25 and nut 21. It might be thought that since all three screws and nuts would expand and contract by the same amount, that, although such expansion would raise and lower the support surface, that the surface would not tilt. However, tilting can occur as a result of different screws engaging the corresponding nuts at different heights. The fact that the height at which a screw engages its nut affects tilt of the support surface 18, can be seen by considering FIGS. 4A and 4B which are simplified views of portions of the screw 25x and nut 21x. In these simplified views, it is assumed that the screws rest on the support surface 18 and that the distance D of the lower surface of the nut and the support surface 18, is equal to the initial thickness D of the nut. It is also assumed for purposes of explanation, that while the screw expands with temperature, the nut 21 does not expand with temperature.

In FIG. 4A, it is assumed that the screw engages the nut at the point 42 which is at the bottom of the nut. When the temperature rises a given amount, the point 42 on the screw will rise up to the point 42a. The support surface will then be raised from the position 18 to the position 18a. In FIG. 4B, the same situation is present, except that the screw contacts the nut at the position 44, which is at the top of the nut. Since the position 44 is twice as high as the position 42, the same temperature rise will result in the point 44 on the screw rising to the point 44a which is at a height 2D above the initial point 44. Since it was assumed that the nut does not expand in thickness, the bottom of the nut and the support surface, will rise from the position 18 to the position 18b, which is at a height 2D above the initial position. In comparing the final positions of 18a and 18b of the support surface in FIGS. 4A and 4B, it can be seen that the amount by which the location along the support surface rises, is dependent upon the precise location at which the screw contacts the nut. Even with accurate fine threads, it cannot be determined where along the height of the nut, the screw will contact it. If one screw contacts its nut at a different height than where another screw contacts its corresponding nut, then a change in temperature could result in tilting of the support surface 18.

In the prior art, the screw and nut were made of different materials, in order to prevent galling. In accordance with the present invention, applicant constructs the screw and nut such as 25 and 21, of the same material, or at least of material of the same thermal coefficient of expansion (tce). If the screw and nut have the same tce, then it does not matter where, along the height of the nut, the screw engages it. Instead, the bottom of the nut will rise and fall in the same amount as a point on the screw, no matter where the screw and nut make contact. In the condition of FIG. 4B, but with the nut having the same tce as the screw, when the point 44 on the screw rises by the distance 2D, the expansion of the nut will result in the bottom of the nut moving down by the distance D, so the height of the bottom of the nut and of the support surface 18, will be the same as for the situation in FIG. 4A.

The screws and nuts should be made of material of low tce. Common machine-component materials have a tce above 10 ppm/°C. (parts per million per degree C.), with iron, aluminum, and copper respectively having tce's of 12, 25, and 17 ppm/°C. A tce of less than 10 ppm/°C., and preferably no more than about 1 ppm/°C. is desireable, so that slight differences in the heights of the nuts above the bottoms of the screws (due to the grounding surface 32 not being sufficiently level) do not result in tilting with temperature changes. Invar, an alloy of iron and nickel, which has a thermal coefficient of expansion of about 1 ppm/°C., has the lowest thermal coefficient of expansion of any convenient material, but its expansion is significant. However, invar is a difficult metal to machine, and therefore parts constructed of it are relatively expensive. Fused quartz and Cervet, a vitreous ceramic sold by Corning Glass Works, have even lower tce's, but they are even more expensive to machine. It would be possible to construct the base plate 16 of invar or other low tce material, but the cost would be considerable. Instead, applicant uses a lower cost base plate of a material such as aluminum, and uses separate nuts 21-23 constructed of invar and attached to the base plate. The invar screws and nuts have a tce less than one-tenth the tce of the aluminum base member.

A simple approach for attaching the nuts to the base would be to mount the nuts 21-23 on the underside of the base member 16, so the base member merely rests on the nuts. However, this would result in positioning only the lower surface of the base member precisely on a horizontal plane, rather than the upper surface of the base plate on which the tilt sensing device 12 rests. If the base member 18 is of nonuniform thickness, or if it has a variable tce because of nonhomogeneous material, then the upper surface 18 of the base plate could tilt with respect to the lower surface as the temperature changes. To avoid this potential source of error, applicant mounts the nuts 21-23 on the upper surface 18 of the base plate, which is the same surface on which the tilt sensing device is mounted. The nuts can be mounted on the base plate by using a very thin layer of epoxy, by a pair of small screws, or other means. Each screw extends downwardly from a nut through a hole 50 in the base member, with the holes 50 being wide enough to leave a clearance 52 around each screw so it does not engage the walls of the hole.

In one positioning apparatus that was constructed, the base plate 16 was constructed of aluminum of one half inch thickness, and its width and length were each about six inches. The nuts were each three quarters inch square and had a thickness of one half inch. The screws were one quarter inch in diameter and had eighty threads per inch. Each screw had a length of about four inches and extended below the nut by about three inches. The tile 34 had a tce of about 15 ppm/°C. (parts per million per degree C.) which is close to that of the aluminum (about 20 ppm/°C.). The long screws, of a length below the nuts more than eight times the screw diameter, were able to bend slightly to accomodate any slight difference between their spacing and the spacing of the cup couplings 30 on the tile, instead of rising in the cups. The cups 30 had conical holes, and the screws had rounded bottoms which rested on the walls of the conical holes, to prevent sideward shifting of the screws in the event of earthquakes.

The tilt sensing device 12 includes a pair of bent tubes, shown at 60, 62 in FIG. 1. Each tube such as 60 (FIGS. 5 and 6) is a glass tube with rounded ends 64,66, and contained liquid 68 and a gas bubble 70. The sensor 60 is mounted with its axis of curvature below the tube, in an aluminum housing 74 that has a V-shaped groove 76. The bottom 78 of the groove extends in a horizontal plane. The glass tube sensor 60 is mounted in the groove in four point contact with the walls of the groove, with each end such as 64 of the tube in contact with the walls 80, 82 at opposite sides of the groove as at 84, 86. A spring device formed by a pair of plugs 88 of soft rubber, biases the tube securely down against the walls of the V-groove.

Thus, the invention provides a positioning apparatus for holding a device in a horizontal plane, and maintaining the device accurately in that plane despite changes in the ambient temperature. A base member is supported by a group of screws that engage nuts attached to the base member, with the screws and nuts made of material having the same temperature coefficient of expansion. The nuts are preferably mounted on the upper surface of the base member on which the device to be held is mounted. A tilt sensing device can include at least one curved tube containing a liquid and a gas bubble, and a housing forming a V-shaped groove in which the tube is mounted in four point contact therewith, with each end of the tube in contact with opposite sides of the groove.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. Apparatus for positioning a device precisely in a horizontal plane over a grounding surface, comprising:
   a base member having a support surface for holding a device which is to be positioned in a horizontal plane;
   a plurality of nuts coupled to said support surface of said base member;
   a plurality of screws, each threadably engaged with one of said nuts and having a lower end supported on said grounding surface, said nuts and screws each having a tce (thermal coefficient of expansion) which is less than 10 ppm/°C.;
   said nuts and screws being constructed of material having the same tce, whereby to avoid tilting arising from different locations of engagement of different screws with their corresponding nuts.

2. The apparatus described in claim 1 wherein:
   said base member has a tce greater than that of said screws;
   said support surface faces generally upwardly; and
   said nuts each rest against said support surface and are devoid of contact with the rest of the base member.

3. In an apparatus for supporting a device precisely in a horizontal plane, which includes a base member having an upper surface on which the device can rest, and a plurality of screws supported over the ground and threadable coupled to nuts that are mounted on said base member, the improvement wherein:
   said screws and nuts are each constructed of material having a tce (thermal coefficient of expansion) less than one tenth the tce of the material of said base member; and
   each of said nuts is mounted to said upper surface of said base member, said base member having a hole lying under each of said nuts, and each hole is large enough to pass a corresponding screw therethrough with clearance around the screw so it does not engage the walls of the hole.

4. Apparatus for positioning a device precisely in a horizontal plane over a grounding surface, comprising:
   a base member having a support surface for holding a device which is to be positioned in a horizontal plane;
   a plurality of nuts coupled to said base member;
   a plurality of screws, each threadably engaged with one of said nuts and having a lower end supported on said grounding surface, said nuts and screws each having a tce (thermal coefficient of expansion) which is less than 10 ppm/°C.;
   said nuts and screws being constructed of material having the same tce, whereby to avoid tilting arising from different locations of engagement of different screws with their corresponding nuts;
   a tilt sensor which includes a tube which has rounded ends and which is curved, said tube containing a liquid and a gas bubble;
   a housing resting on said support surface, and having a V-shaped elongated groove, said tube lying in said groove with only its ends in contact with the walls of the groove; and
   means biasing said tube against the walls of said groove in four point contact therewith, with each end of the tube contacting opposite sides of the walls of said groove.

* * * * *